United States Patent [19]
Foyen

[11] Patent Number: 5,083,831
[45] Date of Patent: Jan. 28, 1992

[54] CARPET PROTECTION DEVICE

[76] Inventor: John R. Foyen, Rte. 2 Box 272, Fargo, N. Dak.

[21] Appl. No.: 551,180

[22] Filed: Jul. 9, 1990

[51] Int. Cl.$^5$ ............................................... B60N 3/04
[52] U.S. Cl. .................................. 296/97.23; 296/39.1
[58] Field of Search .................. 296/37.16, 39.1, 97.23

[56] References Cited

U.S. PATENT DOCUMENTS

| | | | |
|---|---|---|---|
| 2,898,146 | 8/1959 | Yubenfreund | 296/39.1 |
| 2,911,253 | 11/1959 | Dewey | 296/39.1 |
| 4,351,555 | 9/1982 | Hashimoto | 296/37.16 |
| 4,361,610 | 11/1982 | Roth | 428/95 |
| 4,588,628 | 5/1986 | Roth | 296/97.23 X |
| 4,668,001 | 5/1987 | Okumura et al. | 296/37.16 |
| 4,673,603 | 6/1987 | Roth | 296/97.23 X |
| 4,968,548 | 11/1990 | Gibson et al. | 296/97.23 X |

FOREIGN PATENT DOCUMENTS 113629  5/1987  Japan ............................. 296/37.16

Primary Examiner—Margaret A. Focarino
Assistant Examiner—Andrew C. Pike

[57] ABSTRACT

A carpet protection device for protecting the carpet of the cargo area in a vehicle includes a housing which may be detachably secured to the vehicle carpet just rearwardly of the front seat of the vehicle. A spring loaded roller has a flexible cover element wound thereon and is positioned within the housing. The flexible cover element is extensible and retractable relative to the housing, and when extended, the flexible cover element covers and protects the carpet of the entire cargo area of the vehicle.

3 Claims, 1 Drawing Sheet

CARPET PROTECTION DEVICE

FIELD OF THE INVENTION

This invention relates to a protection cover device for use in protecting the carpet in automotive vehicles such as station wagons and the like.

BACKGROUND OF THE INVENTION

Owners of certain automotive vehicles often use the vehicles to haul various items in the cargo area of the vehicles. Certain passenger vehicles and certain station wagons have rear seats which may be collapsed to increase the cargo area of the vehicle. When these vehicles are used to haul items, the carpet of the vehicle may become soiled or damaged especially if the items or materials being hauled are greasy or contain corrosive materials such as lawn fertilizer and the like. Some vehicle owners use make shift covers to protect the carpet.

Certain prior art devices have been developed for protecting cargo areas of the vehicle such as the device disclosed in the U.S. Pat. No. 4,789,574. Other prior art devices such as those shown in U.S. Pat. No. 4,171,145 and U.S. Pat. No. 3,537,746 illustrate extendable and retractable covers for motorcycle seats. However, none of these prior art devices or any known prior art devices disclose the concept of an extendable and retractable cover for protecting the cargo area of a vehicle such as a station wagon.

SUMMARY OF THE INVENTION

An object of this invention is to provide a novel retractable and extendable cover device, of simple and inexpensive construction, for use in protecting the carpet in automotive vehicles such as station wagons and the like. In carrying out the invention, the extendable and retractable protector cover device includes a rectangular shaped housing which may be positioned behind the front seats of an automotive vehicle such, as a station wagon and the like, and is detachably secured to the carpet by a fastening tape sold under the trademark VELCRO or similar means. An elongate flexible plastic cover element has one end secured to a spring loaded roller mounted in the housing and the cover element is wound on that roller when the cover device is in the retracted position. The cover element may be pulled from the rectangular housing to cover the entire cargo area. The outermost end of the cover element may be releasably secured to the rear end of the vehicle carpet by means of a VELCRO fastener. The flexible cover element is formed of a vinyl or similar material which provides an excellent protective covering for the carpet. The flexible cover element may be readily retracted by detaching the outer end from the vehicle carpet and then allowing the spring urged roller to rewind the cover element into the housing.

FIGURES OF THE DRAWING

DESCRIPTION OF THE PREFERRED EMBODIMENT

Figure 1:
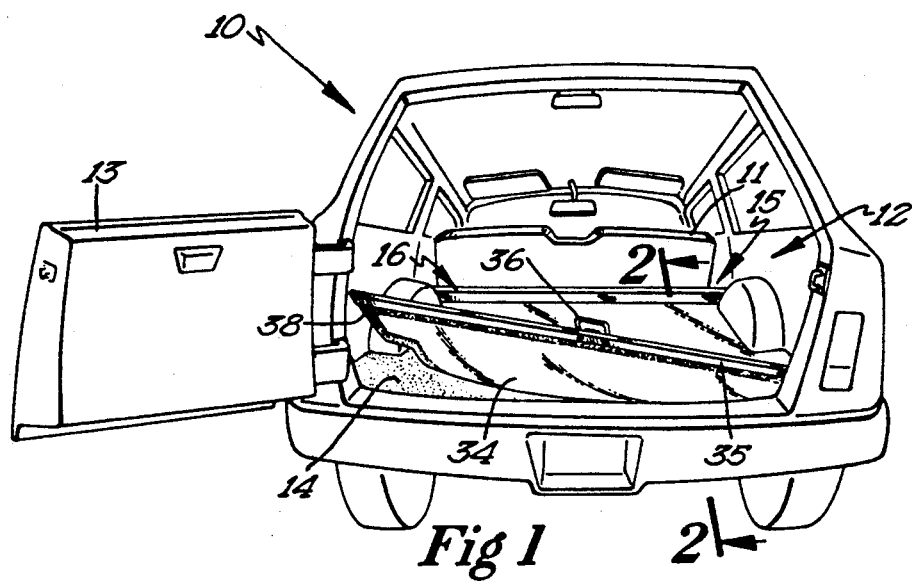
FIG. 1 is a rear perspective view of a station wagon incorporating the extendable and retractable protective cover device.
Figure 2:
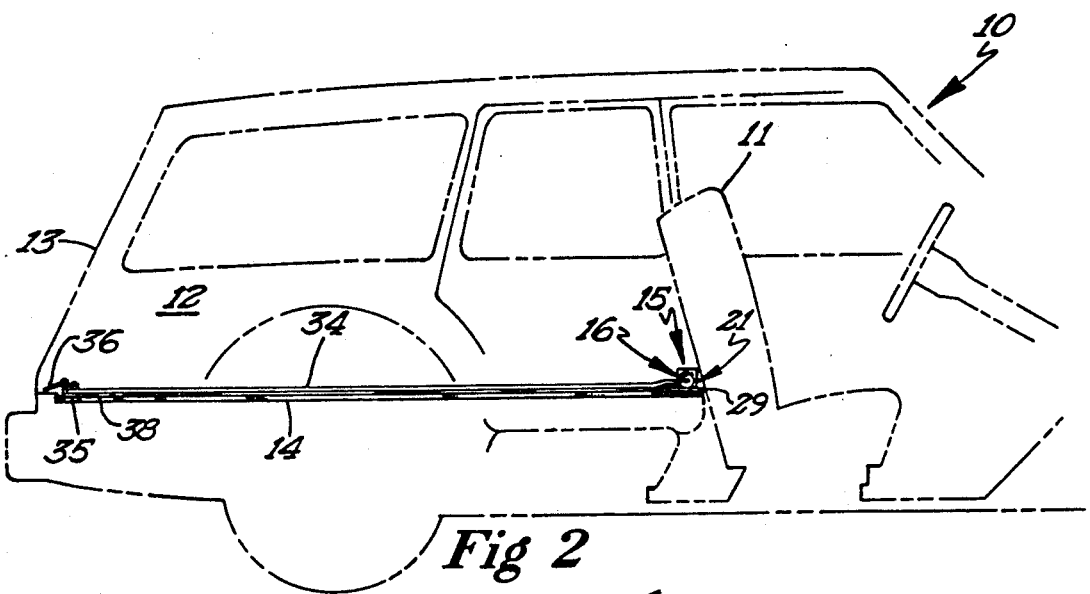
FIG. 2 is a cross-sectional view taken approximately along line 2—2 of FIG. 1 and looking in the direction of the arrow.

Referring now to the drawings and more specifically to FIGS. 1 and 2, it will be noted that the novel cover device for vehicle carpets, designated generally by the reference numeral 15, is illustrated in a conventional automotive vehicle such as the station wagon 10. It will be seen that the novel carpet protection device 15 is applied to the cargo area 12 located just rearwardly of the front seats 11 of the station wagon. The station wagon 10 is provided with a conventional rear door 13 which is horizontally swingable about a vertical axis. The novel protection device 15, when extended, covers and protects the carpet 14 of the station wagon 10.

The novel carpet protection device includes an elongate rectangular shaped housing 16 which is formed of a suitable rigid material such as plastic, metal or the like and includes a front wall 17, a rear wall 18, a top wall 19, and a bottom wall 20. The ends of the housing 16 are closed by rectangular shaped end caps 21 each having a top flange 22, bottom flange 23 and opposed side flanges 24 which overlie and engage the adjacent walls of the housing 16. Suitable bolts 25 secure the top flange 22 and bottom flange 23 respectively to the top wall 19 and bottom wall 20 of the housing 16. The end caps 21 each has a circular inwardly concave recess 26 therein. Each recess has a transverse slot 27 therein.

Figures 3, 4:
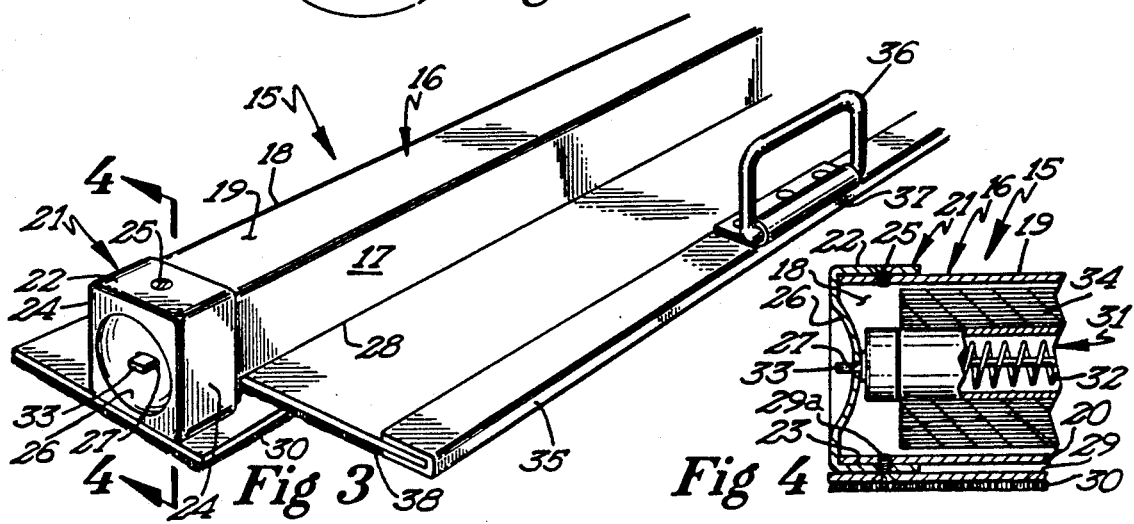
FIG. 3 is a fragmentary perspective view of the extensible and retractable protective cover device with the cover element in a partially extended condition.
FIG. 4 is a cross-sectional view taken approximately along line 4—4 of FIG. 3 and looking in the direction of the arrow.

Referring now to FIG. 3, it will be seen that the front wall 17 of the housing 16 has an elongate slot 28 therein which extends longitudinally of the housing. The slot 28 cooperates with the bottom wall 20 to define an elongate opening in the housing as clearly seen in FIG. 3. It will also be seen that the housing 16 is secured to a generally rectangular shaped base plate 29 by suitable bolts 29a which threadedly engage in threaded slots in the base plate and in the bottom wall 20 of the housing 16. The lower surface of the base plate 29 has an elongate VELCRO fastener strip 30 secured thereto which detachable secures the base plate and the entire carpet protection device 15 to the carpet of the vehicle just rearwardly of the front seats 11. A VELCRO type fastener strip consists of opposing pieces of fabric, one with a dense arrangement of tiny nylon hooks, and the other with a dense nylon pile, that interlocks when pressed together. VELCRO fasteners are sometimes referred to as hook and loop fasteners. When the carpet protection device is secured to the carpet, it will be noted that the housing 16 extends transversely of the vehicle substantially throughout the interior width thereof.

The housing 16 has an elongate cylindrically shaped roller 31 positioned therein, and it will be noted that the roller 31 is provided with a helical spring 32 located interiorly thereof. The roller 31 is provided with a flat substantially rectangular shaped end elements 33 which project through the slots 27 in the end caps 21. It will therefore be seen that when the roller 31 is rotated in one direction, a ratchet mechanism (not shown) will ratchet the roller and spring into the tensioned condition. When the roller is thereafter released from tensioned condition, the helical spring will urge the roller to rotate in the reverse direction to relieve the tension on the spring 32. The roller and ratchet mechanism is of conventional construction.

One end of an elongate generally rectangular shaped flexible vinyl protective cover 34 is secured to the roller and is wound thereon when the carpet protection device 15 is in the retracted position. The protective cover 34 may be transparent or it may be colored in any selected color. The outer end of the protective cover 34 is provided with an elongate stiffening element 35 which may be formed of a suitable metal or plastic material and which extends throughout the width of the cover. A U-shaped handle 36 is pivotally mounted in a sleeve bracket 37 which is suitable secured to the stiffening element 35 by suitable bolts or the like. The VELCRO fastener 38 is secured to the lower surface of the protective cover 34 throughout its width to permit releasable attachment of this outer end to the carpet located at the rear end of the vehicle.

The carpet protection device 15 is normally in the retracted position. When it is desirable to use the device to protect a vehicle carpet, the user will grasp the handle 36 and pull the protective cover 34 from the housing 16 until the outer end of the cover is located adjacent the rear of the vehicle. The outer end may then be releasable anchored to the carpet by the VELCRO fastening strip secured to the lower surface of the cover adjacent the outer end thereof. Articles may then be loaded in the cargo area without soiling the carpet or causing damage to the carpet. The vinyl cover 34 is for all practical purposes chemically inert and will not be affected by oils, corrosive fertilizers or similar materials. In the event that the interior configuration of the station wagon or vehicle includes wheel wells as shown in FIG. 1, the protective cover may be shaped to conform to the wheel well configuration so that the entire carpet is covered as illustrated in FIG. 1.

Since the vinyl cover is impervious to liquids, the over may be wiped clean prior to retracting the cover into the housing. In this regard, the vinyl cover may be readily retracted into the housing by detaching the outer end of the cover from the vehicle carpet and releasing the ratchet to allow the spring loaded roller to rewind the vinyl cover upon the roller 31. It is pointed out that the conventional ratchet mechanism may be omitted since the vinyl cover is releasably retained in the extended portion by the VELCRO fastening strip.

It will be seen that the carpet protection device is of compact low profile construction and does not noticeably interfere with the capacity of the vehicle but provides an excellent protective means for the vehicle carpet. The entire device may be readily removed from the vehicle when the cover is in the retracted position by merely disengaging the VELCRO fastener on the lower surface of the mounting plate from the carpet. Because of it small compass, the carpet protection device may be readily stored in any convenient location such as the garage of the user.

Thus it will be seen that I have provided a novel carpet protection device, which is not only of simple and inexpensive construction, by one which functions in a more efficient manner than any heretofore known comparable device.

What is claimed is:

1. An extensible and retractable protective cover device for carpets of a cargo area in automotive vehicles such as station wagons having front seats, said device comprising:

an elongate generally rectangular shaped housing having a top wall, bottom wall, front and rear walls, said front wall facing rearwardly of the vehicle, an elongate opening in said housing extending longitudinally of the housing, said opening being defined between said front wall and said bottom wall, first hook-and-loop fastening means secured to the bottom wall of the housing and releasably securing the housing to the carpet of the vehicle adjacent but just rearwardly of the front seats of the vehicle so that the housing extends transversely of the vehicle, an elongate spring-urged roller mounted in said housing, an elongate flexible plastic cover element having one end thereof secured to said roller and wound thereon and being extensible and retractable relative to said housing, said cover element when retracted into said housing being wound on said roller so that another end thereof is positioned adjacent the opening in the housing, said cover element when extended from said housing being unwound from said roller for covering substantially the entire carpet of the cargo area of the vehicle, and second hook-and-loop fastening means for releasably securing the other end of said flexible cover element to the carpet of the vehicle adjacent the rear end of the vehicle.

2. The cover device as defined in claim 1 wherein said first means includes an elongate mounting plate secured to a lower surface of said housing.

3. The cover device as defined in claim 1 further including a handle secured to said other end of the flexible cover element for facilitating extension and retraction of the flexible cover element relative to the housing.

* * * * *